No. 712,497. Patented Nov. 4, 1902.
T. S. COFFIN.
FISH HOOK.
(Application filed Feb. 27, 1902.)
(No Model.)

WITNESSES

INVENTOR
Thaddeus S. Coffin
by Herbert W. Jenner
Attorney

UNITED STATES PATENT OFFICE.

THADDEUS S. COFFIN, OF REVERE, MASSACHUSETTS.

FISH-HOOK.

SPECIFICATION forming part of Letters Patent No. 712,497, dated November 4, 1902.

Application filed February 27, 1902. Serial No. 95,966. (No model.)

*To all whom it may concern:*

Be it known that I, THADDEUS S. COFFIN, a citizen of the United States, residing at Revere, in the county of Suffolk and State of Massachusetts, have invented certain new and useful Improvements in Fish-Hooks; and I do hereby declare the following to be a full, clear, and exact description of the invention, such as will enable others skilled in the art to which it appertains to make and use the same.

This invention relates to fish-hooks; and it consists in the novel construction and combination of the parts hereinafter fully described and claimed.

Figure 1:
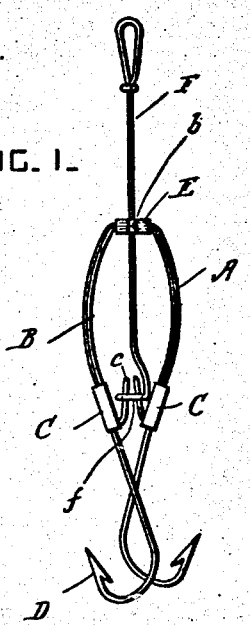
Figure 2:
Figure 3:
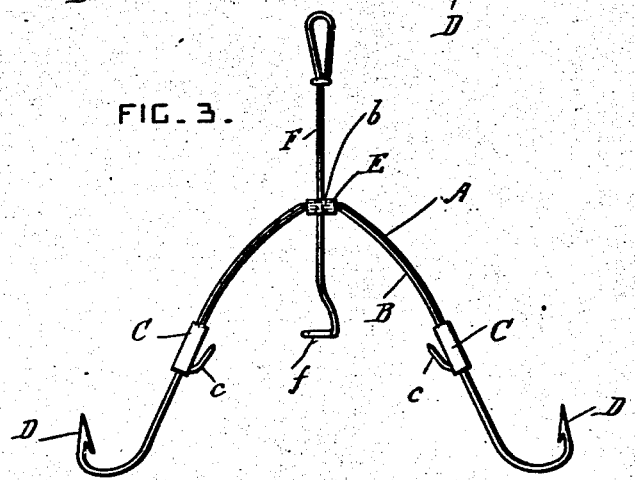

In the drawings, Figure 1 is a front view of the device in its normal position. Fig. 2 is a side view of the same. Fig. 3 is a front view showing the device expanded.

A is a bow, of brass or other flexible material. This bow is reinforced upon its inner side with a spring B, of sheet-steel or other resilient material.

C represents sockets secured to the end portions of the parts A and B and which couple them together.

D represents barbed hooks secured to the sockets C and arranged to project in opposite directions. Two hooks D, or any number of hooks more than two, can be used, according to the use to which the device is to be put. Each socket C has also an upwardly-projecting pin or catch c on its inner side.

E is a reinforcing guide plate or clip which incloses the middle portions of the parts A and B, and b is a guide-hole through the said parts and plate.

F is a shank which is slidable in the hole b. This shank has a loop or clip f at its lower end, which normally engages with the pins c, as shown in Fig. 1.

The fishing-line is secured to the upper end of the shank F in any approved manner. The hook is baited, and when a fish swallows the bait the line is jerked upward, causing the clip of the slidable shank to leave the pins and permitting the device to expand to the position shown in Fig. 3. The fish can also impale itself when the line is secured to a stationary object in an attempt to carry off the bait.

What I claim is—

1. The combination, with a bow, and a reinforcing-spring; of hooks secured to the end portions of the said bow, and a slidable shank which normally engages with catches at the end portions of the said bow and prevents the hooks from spreading, substantially as set forth.

2. The combination, with a bow, and a reinforcing-spring; of sockets which secure the end portions of the said spring and bow together, said sockets being provided with catches, hooks secured to the said sockets, and a slidable shank provided with a clip which normally engages with the said catches, substantially as set forth.

In testimony whereof I affix my signature in presence of two witnesses.

THADDEUS S. COFFIN.

Witnesses:
GEORGE W. SKANKS,
ABBIE F. COFFIN.